No. 622,481. Patented Apr. 4, 1899.
D. C. JACKSON.
MEANS FOR SECURING ELECTRICAL UNITY OF SYSTEMS OF METALLIC PIPES OR MAINS.
(Application filed Oct. 12, 1898.)
(No Model.)

Witnesses:

Inventor;
Dugald C. Jackson,
By Barlow & Brown,
Attorneys.

UNITED STATES PATENT OFFICE.

DUGALD C. JACKSON, OF MADISON, WISCONSIN.

MEANS FOR SECURING ELECTRICAL UNITY OF SYSTEMS OF METALLIC PIPES OR MAINS.

SPECIFICATION forming part of Letters Patent No. 622,481, dated April 4, 1899.

Application filed October 12, 1898. Serial No. 693,335. (No model.)

*To all whom it may concern:*

Be it known that I, DUGALD C. JACKSON, a citizen of the United States, residing at Madison, in the county of Dane and State of Wisconsin, have invented a certain new and useful Improvement in Means for Securing the Electrical Unity of Systems of Metallic Pipes or Mains, (Case No. 2,) of which the following is a full, clear, concise, and exact description.

My invention relates to improvements in means for securing the electrical unity of systems of metallic pipes or mains, the object thereof being the prevention of injury to the same by reason of the disintegrating effect of heavy electrical currents when such pipes or mains afford imperfect conduction for the current.

It has been observed in practice that water-mains, for example, become gradually disintegrated when serving in part or entirely as a return-conductor for the current of electric-railway systems.

As is well known, water-mains usually are constructed of lengths of cast-iron pipe united at their ends by telescoping the same for a short distance and flowing lead into the annular space separating the said pipes. This connection, while serving satisfactorily to unite the pipes mechanically for their intended use, does not secure the necessary electrical unity between the pipes which is requisite to prevent the disintegrating effect of electric currents.

Having the above considerations in mind, I have devised means for securing the electrical unity of a system of pipes and for preventing injury to the same through the flow of the electric current.

In practicing my invention I form upon the individual lengths of pipe lugs or enlargements which are adapted to receive an electrical bond and unite the several individual lengths to form a continuous conductor. Under some circumstances the said pipes are also connected at intervals with a common conductor especially provided for the purpose or some external conducting body, such as the rails of a street-railway system.

I will describe my invention more particularly by reference to the accompanying drawings, illustrating embodiments of my invention as applied to a system of water-mains, wherein—

Figure 1:
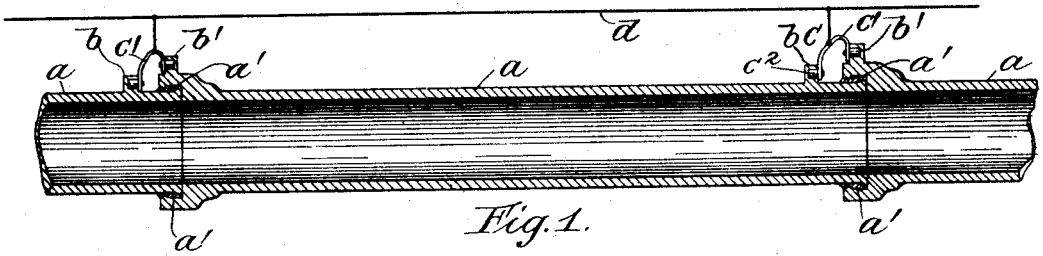
Figure 2:
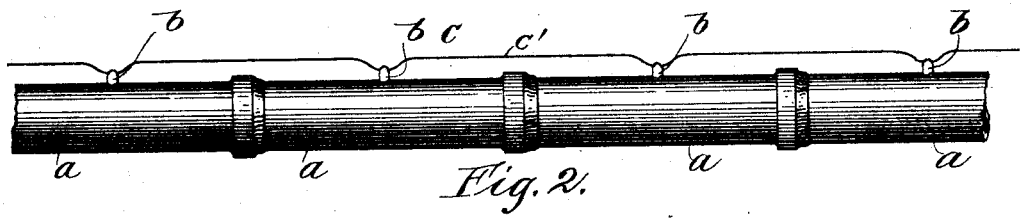
Figure 3:
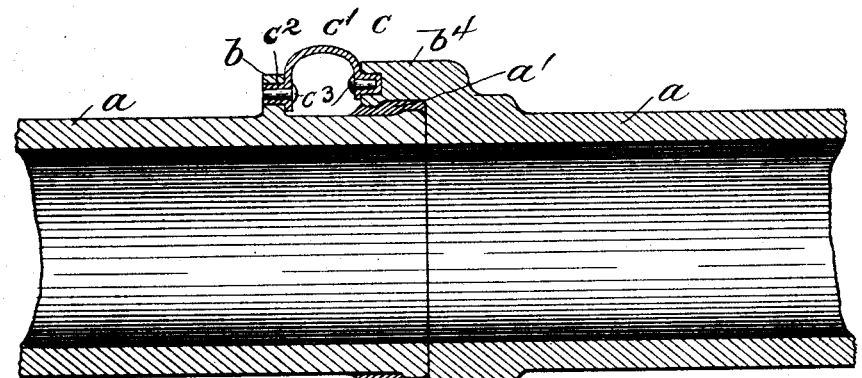
Figure 4:
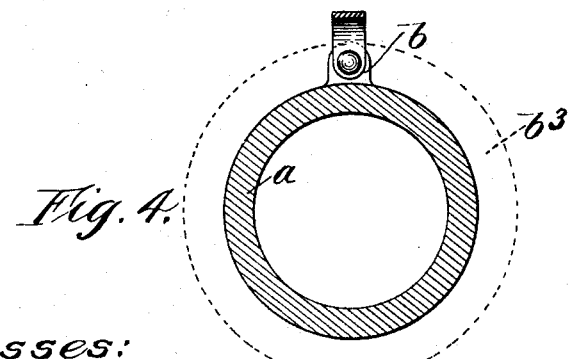

Figure 1 is a longitudinal sectional view illustrating portions of three individual lengths of water-pipe having suitable enlargements or lugs provided thereon which are connected by means of electric bonds, the main in addition being connected to an external or supplementary conductor. Fig. 2 illustrates a modification thereof wherein the supplementary conductor or bond is connected to lugs or enlargements formed midway upon the individual lengths of pipe. Fig. 3 is an enlarged longitudinal sectional view of a pipe-joint formed in the manner which I ordinarily prefer in practicing my invention. Fig. 4 is a cross-sectional view of the pipe having a bond attached thereto, the said view indicating also, by means of the dotted line, the provision of an annular enlargement adapted to receive the bond at any portion of its circumference.

The same letter of reference is used to designate like parts in each of the several figures of the drawings.

The individual lengths of pipe $a$ are united in the well-known manner by means of molten lead $a'$, flowed between the pipe ends and compacted by cold-chiseling. Upon the individual lengths of pipe are provided lugs or enlargements $b$, and in the form shown in Figs. 1 and 3 additional lugs or enlargements $b'$ are provided upon the lengths of pipe, between which lugs extend the conductors or bonds $c$.

In Fig. 4, showing the transverse sectional view of the bonded pipe, the lug or enlargement is indicated as taking the form of an annular enlargement or ring $b^3$, which obviously is the full equivalent of the form shown in the other figures with the additional advantage that connection may be effected at any point upon the circumference of the pipe. This advantage is shared as well by the employment of an enlarged flanged coupling-head $b^4$. (Shown in Fig. 3.)

I may employ any suitable form of bond, but will describe the one preferred by me, which consists of a conductor $c'$, provided at its ends with tubular extensions $c^2$, which are adapted to fit within holes bored in the lugs or enlargements provided upon the abutting ends or other portions of the pipe and are then expanded by means of the slightly-tapered cylindrical plugs $c^3$, which are driven into the openings provided in said extensions, and the heads thereof are riveted or battered down to form a close joint between the bond and the lengths of pipe. This serves to secure the electrical unity of the lengths thus united.

In Fig. 1 the bonds $c$ serve to connect lugs $b\ b'$, formed upon the abutting ends of the lengths of pipe, the said bonds being in turn connected with an external conductor $d$, which may be laid alongside the mains or otherwise suitably disposed for this special purpose, or it may consist, instead, of any suitable external conductor, such as the rails of an electric-railway system.

In Fig. 2, which is best adapted for uniting the lengths of pipe under some circumstances, the bond takes the form of a conductor $c'$, extending throughout the length of the main or pipe, and is electrically united with the individual lengths of pipe by means of lugs formed midway upon the same.

Except in the event of using very heavy mains having thick walls it is undesirable to drill directly into the body of the wall or main and in any position where the same would be weakened, and I have theretofore deemed it expedient to show water-mains wherein enlargements of suitable form were provided thereon, serving, when connected by suitable bonds, to unite the pipes electrically, while in no wise weakening the mains for their intended use.

It will be seen that water-mains or other systems of piping when united in the manner indicated above will be free from any injurious effects commonly resultant from the flow of heavy currents throughout the length of pipe.

It is apparent that numerous alterations may be made in the precise means shown for practicing my invention without departing from the spirit thereof, and I do not desire to be understood as limiting my said invention to the exact embodiment herein shown and described; but, Having set forth the preferred means for practicing my invention, what I claim as new, and desire to secure by these Letters Patent, is—

1. As a new article of manufacture, a length or section of fluid-conducting pipe or main having an enlarged portion formed thereon adapted to be connected with an electrical conductor, whereby an effective electrical joint may be obtained between said section or length and an adjoining section or sections, and the main is preserved from deterioration, substantially as described.

2. As a new article of manufacture, a length or section of fluid-conducting pipe or main having enlarged portions formed thereon at or near either end adapted to be connected with electrical bonds or conductors united with adjoining lengths of fluid-conducting pipe, whereby the electrical unity of the system formed of said pipes is secured, substantially as described.

3. A system of fluid-conducting mains consisting of individual lengths of pipe mechanically united to form a continuous pipe or main, said lengths of pipe being provided with enlarged portions, and electrical conductors or bonds connected between the enlarged portions of the pipe or main, whereby the electrical unity of the system is secured, substantially as described.

4. The combination with a plurality of individual lengths of pipe, $a$, having enlarged portions $b$ provided thereon, said lengths of pipe being united to form a continuous fluid-conducting main, of electrical bonds or conductors $c$ connected with the said enlarged portions $b$, whereby the lengths of pipe are electrically united, thus securing the electrical unity of the system of pipes or mains, substantially as described.

5. The combination with a plurality of lengths or sections of pipe united to form a continuous main and having enlarged portions provided at or near the ends of said sections, of electrical bonds $c$ connected between the said enlarged portions, whereby the electrical unity of the main is secured and deterioration is obviated, substantially as described.

6. The combination with abutting lengths of a water-main $a$ mechanically united to form a single fluid-conducting main, of lugs $b\ b'$ formed at or near the ends of said lengths, the same being drilled to receive electrical bonds, and bonds $c$ connected between the said lugs $b\ b'$ adapted to secure the electrical unity of the system, whereby the injurious effects of heavy electric currents are avoided, substantially as described.

7. The combination with a plurality of sections or lengths of fluid-conducting pipe $a$ united to form a continuous main and having enlarged portions $b$, of electrical bonds $c$ connected between the said enlarged portions, and a supplementary conductor $d$ electrically connected at intervals with the main, whereby the electrical unity of the same is secured, substantially as described.

In witness whereof I hereunto subscribe my name this 13th day of August, A. D. 1898.

DUGALD C. JACKSON.

Witnesses:
LIZZIE ARMSTRONG,
MABEL F. JACKSON.